United States Patent
Park et al.

(10) Patent No.: US 7,903,523 B2
(45) Date of Patent: Mar. 8, 2011

(54) DATA RESTORING METHOD AND HOLOGRAPHIC DATA RECORDING AND/OR REPRODUCING APPARATUS TO RESTORE QUANTIZATION DATA TO BINARY DATA

(75) Inventors: Hyun-soo Park, Seoul (KR); Jin-han Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 11/946,285

(22) Filed: Nov. 28, 2007

(65) Prior Publication Data
US 2008/0239914 A1 Oct. 2, 2008

(30) Foreign Application Priority Data
Mar. 26, 2007 (KR) .................. 10-2007-0029364

(51) Int. Cl.
 *G11B 7/00* (2006.01)
(52) U.S. Cl. ..................... 369/103; 369/59.23
(58) Field of Classification Search .............. 369/103, 369/59.23; 359/10, 15, 35, 239, 9, 29, 22; 430/1, 2; 365/125, 126
See application file for complete search history.

(56) References Cited

U.S. PATENT DOCUMENTS

| | | | | |
|---|---|---|---|---|
| 4,149,269 A | * | 4/1979 | Abe et al. | 365/215 |
| 5,511,058 A | * | 4/1996 | Visel et al. | 369/103 |
| 5,777,760 A | * | 7/1998 | Hays et al. | 359/7 |
| 5,859,808 A | * | 1/1999 | Campbell et al. | 365/216 |
| 6,064,586 A | | 5/2000 | Snyder et al. | |
| 6,661,725 B2 | * | 12/2003 | Roh | 365/216 |
| 7,258,957 B2 | * | 8/2007 | Iriguchi | 430/22 |
| 7,277,211 B2 | * | 10/2007 | Baba et al. | 359/24 |
| 7,656,564 B2 | * | 2/2010 | Yoon | 358/483 |
| 2005/0135217 A1 | | 6/2005 | Tateishi et al. | |
| 2005/0185233 A1 | | 8/2005 | Baba et al. | |
| 2008/0008076 A1 | * | 1/2008 | Raguin et al. | 369/103 |
| 2008/0205238 A1 | * | 8/2008 | Hwang et al. | 369/103 |

FOREIGN PATENT DOCUMENTS

| | | |
|---|---|---|
| JP | 2000-122012 | 4/2000 |
| JP | 2005-182910 | 7/2005 |
| JP | 2005-196845 | 7/2005 |

OTHER PUBLICATIONS

International Search Report issued in PCT International Application No. PCT/KR2008/000543 on Apr. 29, 2008.

\* cited by examiner

*Primary Examiner* — Tan X Dinh
(74) *Attorney, Agent, or Firm* — NSIP Law

(57) ABSTRACT

A method for to restore quantization data to binary data in a system for recording and/or reproducing the binary data includes selecting a selection region predicted to include an alignment mark from the quantization data, determining a location of the alignment mark within the selection region; and converting the quantization data to the binary data based on a comparison of the determined location of the alignment mark and an original location of the alignment mark.

17 Claims, 8 Drawing Sheets

(a)                  (b)

PRIOR ART

PRIOR ART

PRIOR ART

DATA RESTORING METHOD AND HOLOGRAPHIC DATA RECORDING AND/OR REPRODUCING APPARATUS TO RESTORE QUANTIZATION DATA TO BINARY DATA

CROSS-REFERENCE TO RELATED APPLICATION

This application claims the benefit of Korean Application No. 2007-29364, filed Mar. 26, 2007 in the Korean Intellectual Property Office, the disclosure of which is incorporated herein by reference.

BACKGROUND OF THE INVENTION

1. Field of the Invention

Aspects of the present invention relate to a data restoring method and a holographic storage data recording and/or reproducing apparatus which moves two-dimensional quantization data to an appropriate location using an alignment mark.

2. Description of the Related Art

Data is recorded in a holographic storage medium by interference between a signal beam and a reference beam. In optical holography, data is not stored on a surface of a recording medium, but is stored in a volume thereof. A signal beam interferes with a reference beam within the recording medium to generate a plurality of interference gratings referred to as a data page. The interference gratings change the optical characteristics of the reference beam, causing overlapping to occur. This process is referred to as multiplexing. To read data from the recording medium, a single reference beam is controlled to be incident on the recording medium under the same conditions as the conditions used during the data recording, thereby generating a diffraction beam having the stored data page. The diffraction beam is detected by a detection array, which extracts a stored plurality of data bits from a measured intensity pattern. The data page contains the data bits, which are also referred to as pixels. By overlapping data pages in the volume of the recording medium, data storage capacity is increased.

As shown in FIG. 1A, a hologram 100 is recorded using a signal beam S to carry data and a reference beam R. During recording of the hologram 100, the reference beam R and the signal beam S interfere with each other to generate an interference pattern, which is transferred to the hologram 100. During reproduction of the hologram 100, as illustrated in FIG. 1B, the original reference beam R is radiated onto the recorded hologram 100, and the recorded hologram diffracts the original reference beam R to generate the output signal beam S. At this time, if the reference beam R is different from the original reference beam R used during recording of data, the intensity or direction of a reproduced signal beam S is different from the intensity or duration of the original recorded signal beam S. Generally, as such a difference increases, the intensity of radiation is defined by a sinc function.

FIG. 2 is a schematic view of a conventional holographic data recording and/or reproducing apparatus 200. Referring to FIG. 2, a signal beam S is controlled to record a page having a plurality of pixels via a spatial light modulator (SLM) 220. The modulated signal beam S passes through an optical system including a polarized beam splitter 230 and a Fourier lens 240, and interferes with a reference beam R passing through a galvanometer scanner 260 and a scan lens 270 on a holographic storage medium 250. An interference fringe generated by this process is recorded on the storage medium 250. In terms of reproduction, when the reference beam R is controlled to be incident on the storage medium 250 where the interference fringe is recorded, the signal beam S is reproduced and detected by a charge-coupled device (CCD) 290 using the Fourier lens 280 due to a diffraction phenomenon. In this case, since different data is reproduced according to the depth and angle of the reference beam R during reproduction, several pages of data can be recorded and reproduced on the same location of the holographic storage medium 250.

A binary signal is recorded on the holographic storage medium 250 as follows. Two-dimensional binary data is generated in the SLM 220. The two-dimensional binary data is detected by a data detection device, such as the CCD 290, as two-dimensional quantization data having an intensity distribution according to optical intensity, and then is reconverted back into two-dimensional binary data. During this time, the two-dimensional quantization data has to be moved to a predetermined location in order to reproduce the two-dimensional quantization data detected by the CCD 290.

FIG. 3A illustrates two-dimensional binary data 310 transmitted by the SLM 220, and FIG. 3B illustrates two-dimensional quantization data 320 detected by the CCD 290. The two-dimensional binary data 310 illustrated in FIG. 3A is used to record data, and each data unit is classified into 0 or 1. The two-dimensional quantization data 320 illustrated in FIG. 3B is similar to the two-dimensional binary data 310 illustrated in FIG. 3A but is gradually shifted according to errors, reproducing locations and angles of various optical elements in the holographic data recording and/or reproducing apparatus 200. That is, after the two-dimensional binary data 310, portions of which have different optical densities, is transmitted through the holographic storage medium 250 and the optical system, a brightness difference between portions of the two-dimensional binary data 310 occurs, and the two-dimensional binary data is represented as a quantified numerical value, i.e., the two-dimensional quantization data 320, rather than the two-dimensional binary data 310. Thus, the reproducing location and angle of the two-dimensional binary data 310 are slightly tilted.

Accordingly, in order to restore the original binary data 310 from the two-dimensional quantization data 320 detected as described above, a signal calibration operation using various processes should be performed. The first process to be performed among the various processes is to move x and y coordinate values to a predetermined location, which is difficult.

SUMMARY OF THE INVENTION

Aspects of the present invention provide a data restoring method and a holographic data recording and/or reproducing apparatus which moves two-dimensional quantization data detected by a detector from a holographic storage medium to an appropriate location using an alignment mark.

According to an aspect of the present invention, a method to restore quantization data to binary data in a system for recording and/or reproducing the binary data includes selecting a selection region predicted to include an alignment mark from the quantization data, determining a location of the alignment mark within the selection region, and converting the quantization data to the binary data based on a comparison of the determined location of the alignment mark and an original location of the alignment mark in the binary data.

According to an aspect of the present invention, the determining of the location of the alignment mark includes obtaining x and y coordinates of a portion of the selection region which is most similar to the alignment mark from the selection region, the x and y coordinates in the forms of integers, and obtaining the x and y coordinates in forms of real numbers by using two pieces of data adjacent to the x and y coordinates.

According to an aspect of the present invention, the acquiring of the x and y coordinates in the forms of real numbers includes calculating the x and y coordinates using a quadratic function $f(x)=ax^2+bx+c$ having a differential value equal to 0, wherein x is a coordinate value of the x coordinate, and f(x) is a mean square error (MSE) value according to the coordinate value.

According to an aspect of the present invention, the converting includes converting the quantization data based on a reciprocal action of x and y coordinates of a portion of the selection region which is most similar to the alignment mark.

According to an aspect of the present invention, the converting includes interpolating the converted quantization data having a converted coordinate value using more than four pieces of the converted quantization data positioned around the converted coordinate value.

According to an aspect of the present invention, the two-dimensional quantization data includes page data read from a holographic storage medium.

According to another aspect of the present invention, a holographic storage data recording and/or reproducing apparatus to record data to and/or reproduce data from a holographic storage medium on which a hologram is recorded by interference between a signal beam and a reference beam includes an optical processing unit to record the data on the holographic storage medium and to reproduce the data from the holographic storage medium, and a controller to control the optical processing unit, to select a selection region predicted to include an alignment mark from quantization data read from the holographic storage medium, to determine a location of the alignment mark within the selection region, and to convert the quantization data to the binary data based on a comparison of the determined location of the alignment mark and an original location of the alignment mark in the binary data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become more apparent and more readily appreciated from the following description of the embodiments, taken in conjunction with the accompanying drawings of which.

DETAILED DESCRIPTION OF THE EMBODIMENTS

Figure 1:
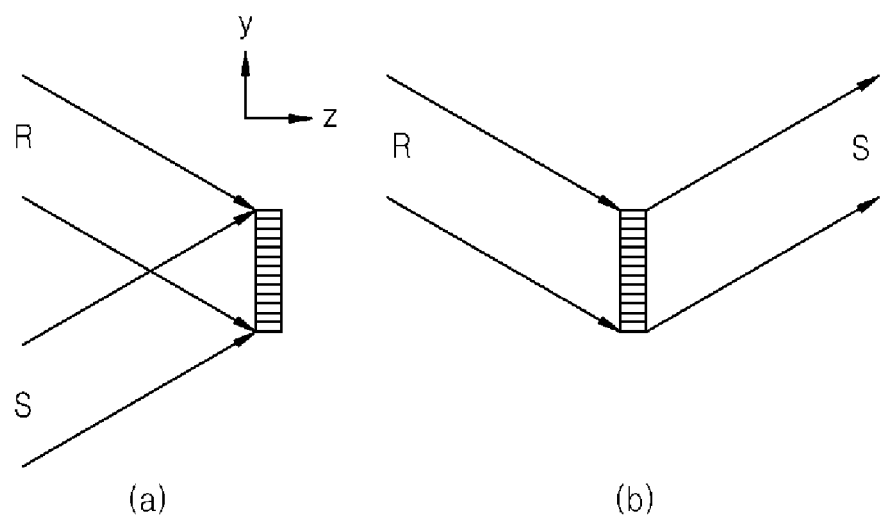
FIG. 1 illustrates recording and/or reproducing operations in optical holography.
Figure 2:
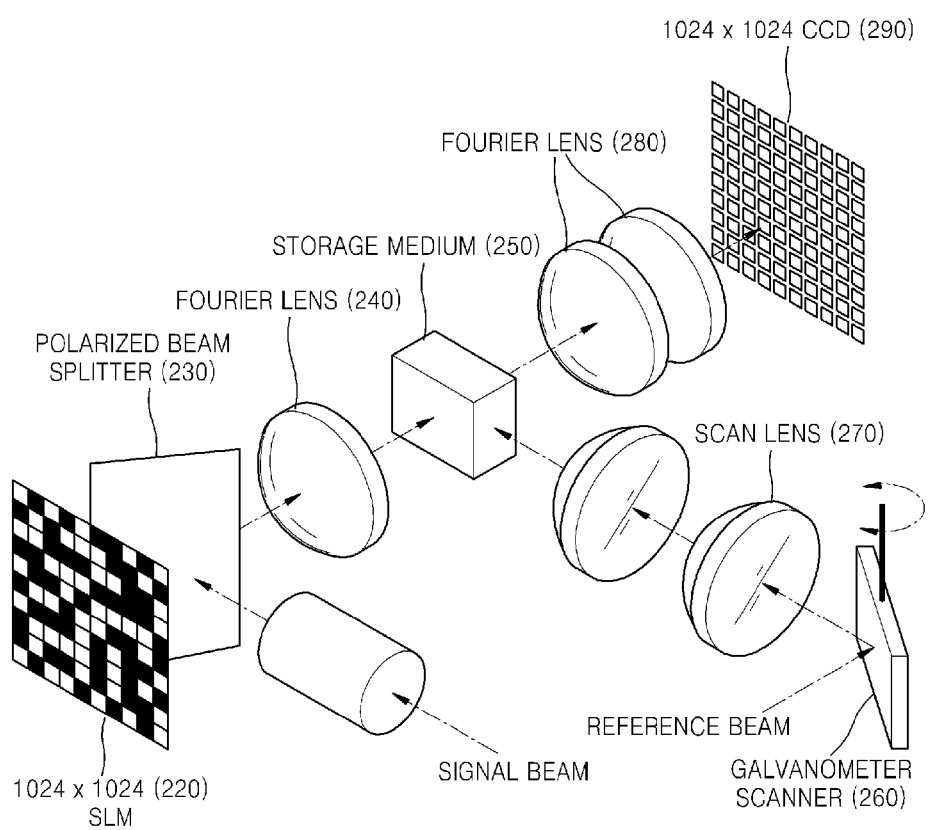
FIG. 2 is a schematic view illustrating a conventional holographic data recording and/or reproducing apparatus.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 4:
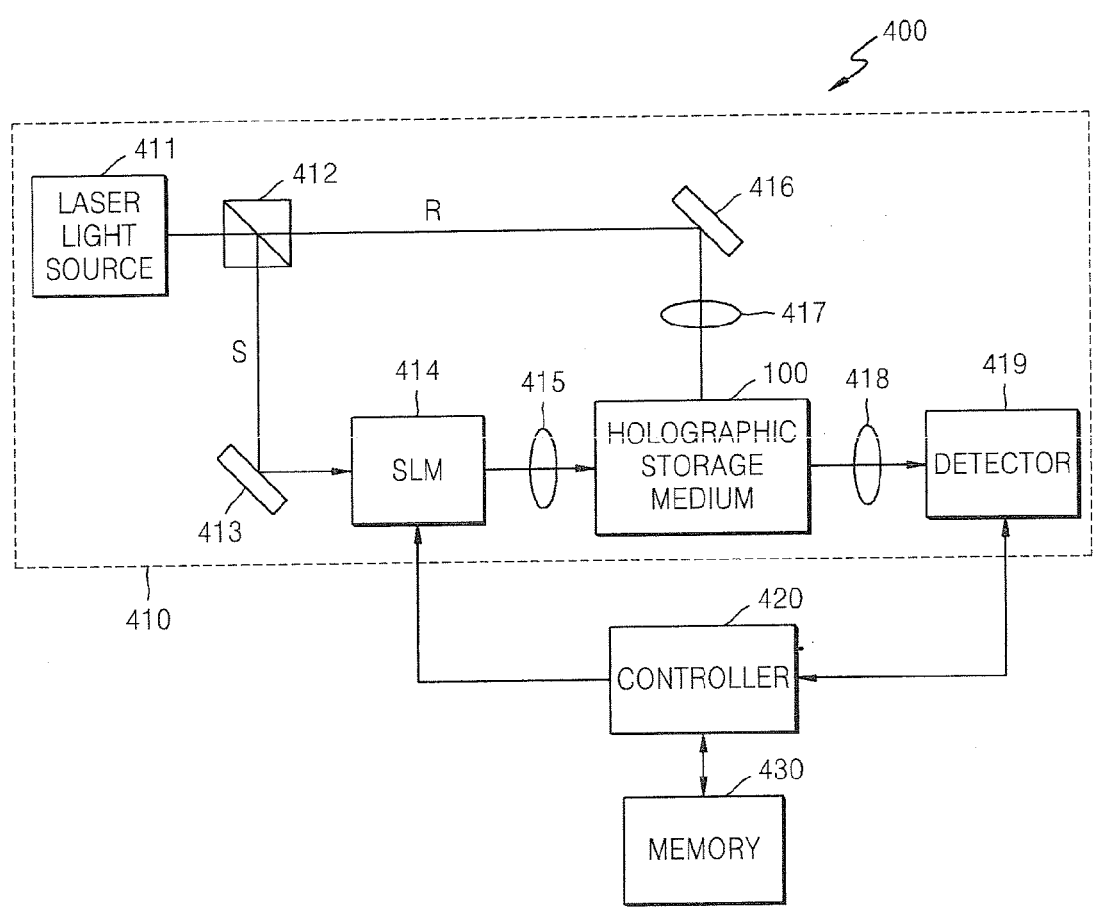
FIG. 4 is a schematic view illustrating a recording and/or reproducing apparatus according to an embodiment of the present invention.

FIG. 4 is a schematic view of a recording and/or reproducing apparatus 400 according to an embodiment of the present invention. Referring to FIG. 4, the recording and/or reproducing apparatus 400 includes an optical processing unit 410 into which a holographic storage medium 100 is inserted, a controller 420 to control the optical processing unit 410 to record data in the holographic storage medium 100 and to reproduce the recorded data from the holographic storage medium 100, and a memory 430. The optical processing unit 410 includes a laser light source 411, a beam splitter 412, a first reflective mirror 413, a spatial light modulator 414, a first lens 415, a second reflective mirror 416, a second lens 417, a third lens 418, and a detector 419. It is understood that other optical elements, such as additional lenses and detectors, may be added to the recording and/or reproducing apparatus 400 shown in FIG. 4.

The controller 420 controls the optical processing unit 410. In addition, the controller 420 generates a data page including recording data to transmit to the optical processing unit 410, and performs a data-processing operation on a signal reproduced by the optical processing unit 410. To perform the data-processing operation, the controller 420 selects a selection region predicted to include an alignment mark from two-dimensional quantization data 320 (FIG. 3(b)) read from the holographic storage medium 100, determines a location of the alignment mark in the selected region, and then converts the two-dimensional quantization data 320 based on a comparison of the determined location of the alignment mark to an original location of the alignment mark in the binary data 310.

In order to determine the location of the alignment mark, the controller 420 acquires x and y coordinates of a portion of the selection region which is most similar to the alignment mark, the coordinates being in the forms of integers, and acquires the x and y coordinates in the forms of real numbers which may have decimal points to a number of decimal places by further selecting at least two pieces of data adjacent to the x and y coordinates acquired in the forms of integers and performing a calculation on the at least two pieces of data. In order to acquire the x and y coordinates in the forms of real numbers having decimal points, a coordinate value can be calculated where a differentiated value of a quadratic function $f(x)=ax^2+bx+c$ (x is the coordinate value, and f(x) is a mean square error (MSE) value according to the coordinate value) is set to 0.

According to an aspect of the present invention, when the controller 420 converts the two-dimensional quantization data 320 based on the determined location of the alignment mark and the original location of the alignment mark, the controller 420 converts the two-dimensional quantization data 320 based on a reciprocal action of the x and y coordinates.

The controller 420 interpolates data of a converted coordinate value. According to an aspect of the present invention, the controller 420 uses more than four pieces of data positioned around the coordinate value to interpolate the data of the converted coordinate value. However, the controller 420 may also use four pieces of data or less than four pieces of data according to other aspects of the present invention.

When data is recorded in the holographic storage medium 100, a laser beam having coherency is output from the laser light source 411 to be incident on the beam splitter 412. The beam splitter 412 divides the coherent laser beam into a reference beam R and a signal beam S. The signal beam S is incident on the spatial light modulator 414. The spatial light modulator 414 performs spatial light modulation (i.e., amplitude modulation) on the signal beam S to transmit data. The modulated signal beam S is focused onto the holographic storage medium 100 by the first lens 415. Meanwhile, the reference beam R is reflected by the second reflective mirror 416 and is incident on the holographic storage medium 100 by the second lens 417. Accordingly, interference fringes, which are generated when the signal beam S and the reference beam R overlap, are recorded on the holographic storage medium 100 as a minute, dense pattern.

In order to reproduce the data recorded on the holographic storage medium 100, another reference beam R, which is transmitted under the same conditions as the reference beam R used to record the data page, is controlled to be incident on the holographic storage medium 100. Thus, data is reproduced as a diffraction light beam corresponding to the interference fringes recorded on the holographic storage medium 100. Then, the diffraction light beam is focused onto the detector 419 by the third lens 418. According to an aspect of the present invention, the detector 419 may be a charge-coupled device (CCD) or a complementary metal-oxide semiconductor (CMOS). However, the detector 419 may also be other types of detectors known in the art. A regenerative signal output from the detector 419 is transferred to the controller 420.

Figure 5A:
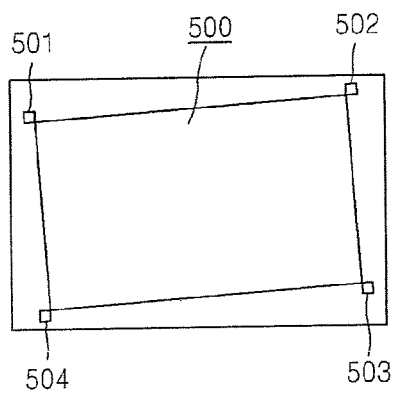
FIGS. 5A, 5B, 5C, and 5D illustrate a process of converting two-dimensional quantization data, according to an embodiment of the present invention.

FIGS. 5A, 5B, 5C, and 5D illustrate a process of converting two-dimensional quantization data 320, according to an embodiment of the present invention. FIG. 5A illustrates two-dimensional quantization data 320 detected by the detector 419.

According to an aspect of the present invention, a certain portion of the data is recorded in original locations, and then the data is arranged based on the predetermined locations in order to recognize the predetermined locations when data is generated by the SLM 414. The arranged data is called an alignment mark. Referring to FIG. 5A, alignment marks 501, 502, 503 and 504 are arranged at four corners of the two-dimensional quantization data 320 of the data region 500 of the data page to arrange the data page corresponding to a CCD region 510. However, it is understood that more or less than the four alignment marks 501, 502, 503 and 504 may be used, and it is further understood that the alignment marks 501, 502, 503 and 504 are not limited to being arranged at the four corners of the data region 500, and may instead be located in various other places, e.g., along the perimeter, etc.

The alignment marks 501, 502, 503, and 504 are configured to have various shapes. The alignment marks 501, 502, 503, and 504 may include predetermined data configured to have a unique shape that cannot be made from the data region 500. Generally, pieces of data are collectively arranged in shapes made up of combinations of rectangles and/or squares, each piece of data having a data value of 1 or 0. FIGS. 6A through 6J illustrate examples of alignment marks, according to aspects of the present invention. However, it is understood that the alignment marks illustrated in FIGS. 6A through 6J are exemplary only, and that many other types of alignment marks may be used as long as the alignment marks are distinguishable from other data in the data region 500. For example, various other combinations of rectangles, squares, triangles, etc. may be combined to make a very large variety of shapes.

Since the alignment marks 501, 502, 503, and 504 are positioned at predetermined locations of the SLM 414, a large amount of data of the data region 500 can be moved to the predetermined locations if the locations of the alignment marks 501, 502, 503, and 504 can be read with respect to the data acquired by the detector 419.

Figure 3:
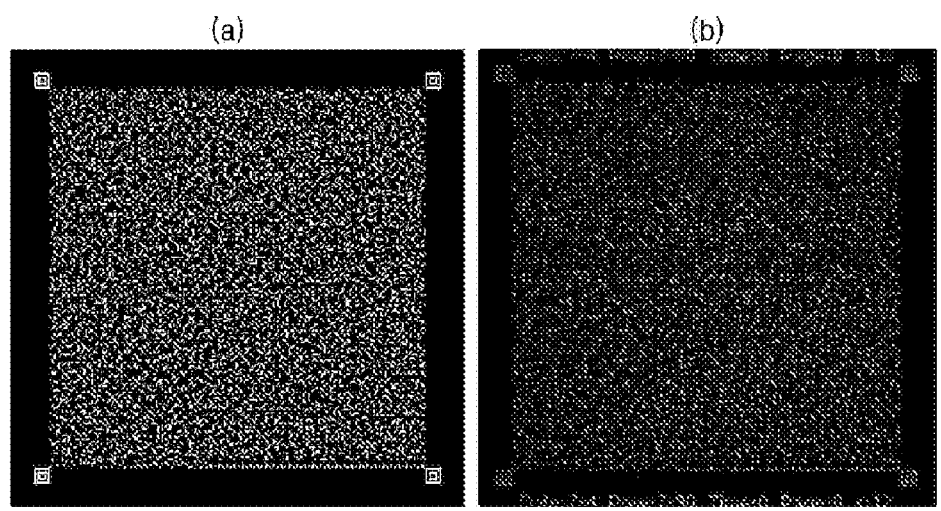
FIGS. 3A and 3B respectively illustrate two-dimensional binary data generated by a spatial light modulator (SLM) and two-dimensional quantization data detected by a detector, such as a (CCD)
Figure 5B:
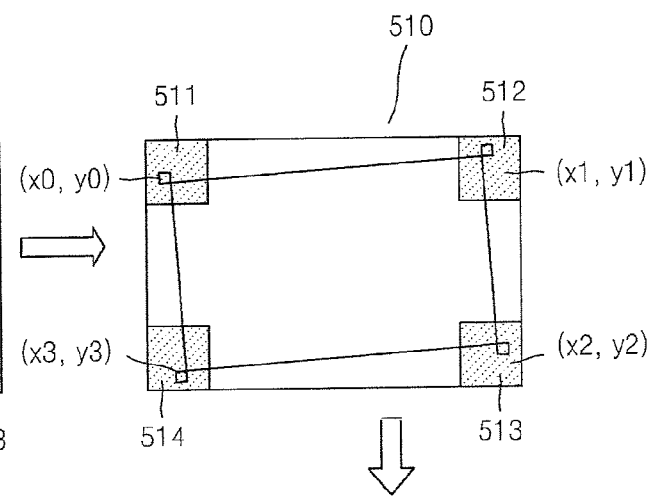

Original data used in the SLM 414 is data whose locations exactly coincide with the two-dimensional binary data 310 illustrated in FIG. 3A, which are a rectangle type or a square type with respect to x and y axes. In order to restore the data to the exact locations, a region of the data region 500 predicted to have alignment marks positioned therein is assigned as a selection region. In FIG. 5B, reference numbers 511, 512, 513 and 514 denote the selection regions. The size of the search region differs according to the precision of the controller 420, and may be determined according to whether the controller 420 is configured as hardware or software. It is understood that the selection regions are not limited to being the four selection regions 511, 512, 513, and 514, and may instead differ in number, size, and location on the data region 500.

Figure 5D:
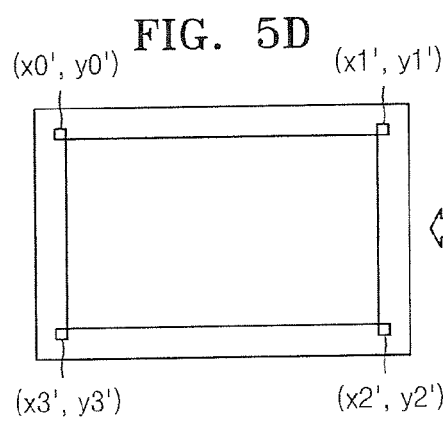
Figure 5C:
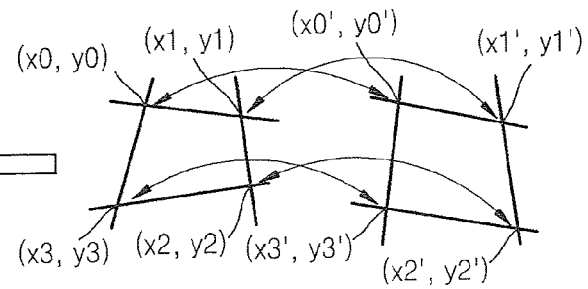
Figure 6A:
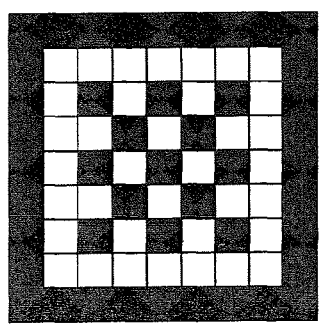
FIGS. 6A through 6J illustrate examples of alignment marks, according to an embodiment of the present invention.
Figure 6B:
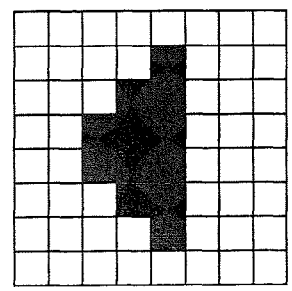
Figure 6C:
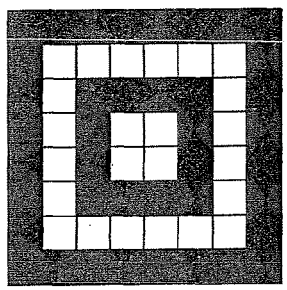
Figure 6D:
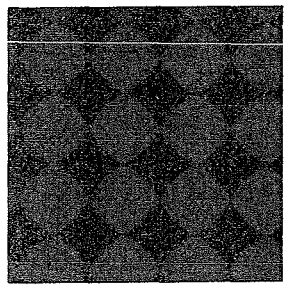
Figure 6E:
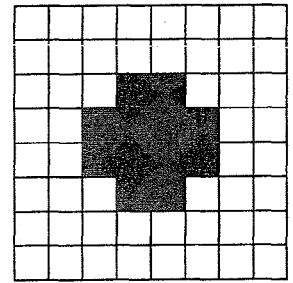
Figure 6F:
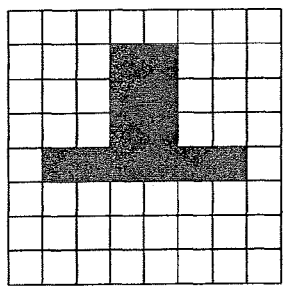
Figure 6G:
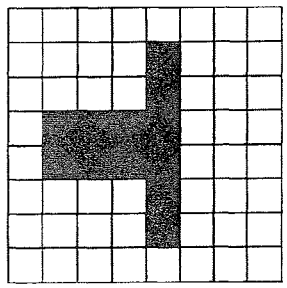
Figure 6H:
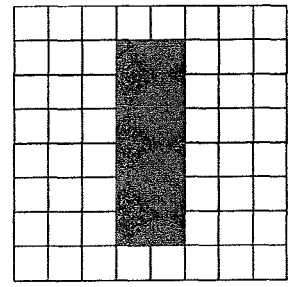
Figure 6I:
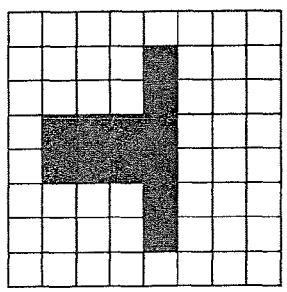
Figure 6J:
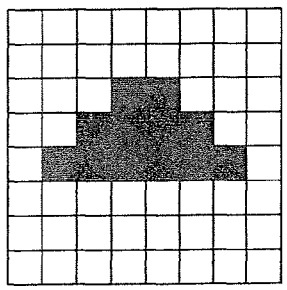

After determining the selection regions 511, 512, 513 and 514, an operation of determining the locations of the alignment marks within the selection regions 511, 512, 513 and 514 is performed. Referring to FIG. 5B, the location of the alignment mark 501 of the selection region 511 is determined as (x0,y0), the location of the alignment mark 502 of the selection region 512 is determined as (x1,y1), the location of the alignment mark 503 of the selection region 513 is determined as (x2,y2), and the location of the alignment mark 504 of the selection region 514 is determined as (x3,y3). When the location of the alignment marks 501, 502, 503, and 504 are determined as described above, data of the data region 500 is moved using the determined locations, as illustrated in FIG. 5C. Then, aligned data is acquired, as illustrated in FIG. 5D.

Figure 7:
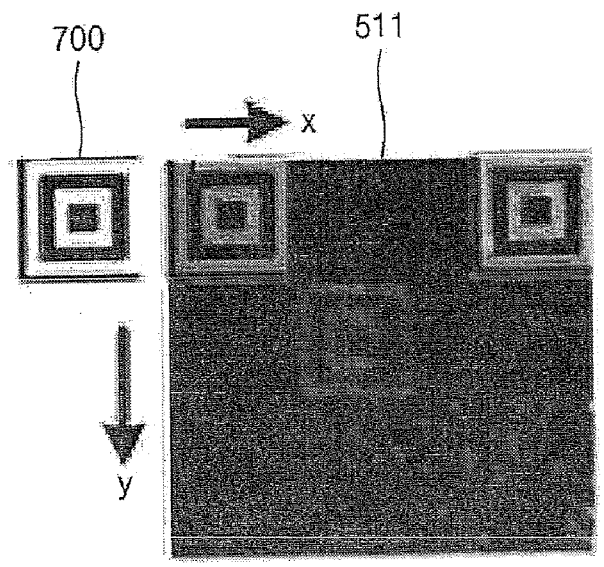
FIG. 7 illustrates a method of searching for an alignment mark in a selection region, according to an embodiment of the present invention.

FIG. 7 illustrates a method of searching for an alignment mark in one of the selection regions 511, 512, 513, or 514, according to an embodiment of the present invention. FIG. 7 illustrates an original alignment mark 700 stored in the memory 430 (FIG. 4) and a selection region 511. While x and y coordinate values of the original alignment mark 700 are each increased by predetermined values with respect to the selection region 511, a part of the selection region 511 most similar to the original alignment mark 700 is searched for. For example, when the original alignment mark 700 is fixed at a maximized y coordinate value and an x coordinate value is increased, a part of the selection region 511 most similar to the original alignment mark 700 is searched for. In addition, when, for example, a y coordinate value is increased by 1, the same operations are repeated. Thus, the part of the selection region 511 which is most similar to the original alignment mark 700 is searched for.

According to an aspect of the present invention, a calculating method to search for a part of the selection region 511 which is most similar to the original alignment mark 700 includes calculating a mean square error (MSE) of a signal value of the original alignment mark 700 and a data value of a region of the selection region 511 which is to be compared with the original alignment mark 700, and then calculating a minimum value of the MSE. An example of a C program for performing the above calculating method is as follows: for (i=0;i<(x2-x1-syncsizex);i++) for (j=0;j<(y2-y1-syncsizey);j++)

```
{
summse=0;
for (k=0;k<syncsizex;k++) for(l=0;l<syncsizey;l++)
summse+=sq(syncdata[k][l]*(onemean-zeromean)+
zeromean-res[i+k][j+l]);
if (summse<minmse)
{
minmse=summse;
    minx=i;
    miny=j;
}
}
```

Variables of the above program are explained as follows. "x1," "x2," "y1" and "y2" are x and y coordinate values of a selection region. "syncsizex" and "syncsizey" are x and y sizes of an alignment mark. "summse" is a variable to store the sum total of an MSE. "syncdata" is alignment mark data. "res" is selection region data. "onemean" and "zeromean" are values to move alignment mark data using mean values of the selection region data, which respectively correspond to 0 and 1, in order to the set selection region data to a center point, since an alignment mark is binary data classified as 0 or 1. "minmse" is a variable to store a minimum amount of MSE data. "minx" and "miny" are x and y coordinates having a minimum MSE value.

When the above method is used, x and y coordinate values of a minimum position are acquired in the forms of integers. However, when the position of the coordinates is acquired in more precise forms having decimal points, the original alignment mark 700 can be moved in smaller, more precise increments. To perform this precision movement, the following algorithm can be additionally used. The algorithm is an algorithm to calculate an MSE of points of a minimum integer, at which +1 and −1 are each added, in the form of a real number having decimal points in the case of acquiring the position of the original alignment mark 700, that is, a position of a minimum MSE of the data value of the original alignment mark 700 and a data value of a region of the selection region to be compared with the original alignment mark 700, in the form of an integer.

Figure 8:
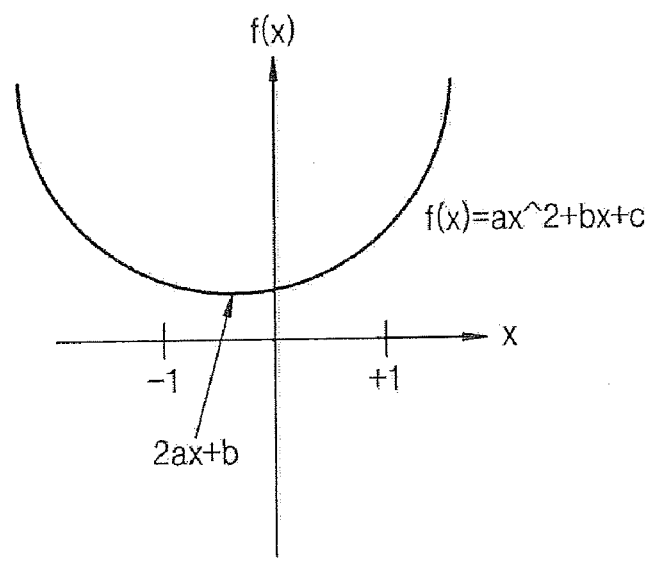
FIG. 8 illustrates a precision calculating method, according to an embodiment of the present invention.

FIG. 8 is a reference view illustrating a precision calculating method, according to an embodiment of the present invention. Referring to FIG. 8, the x values are coordinate values, and the y values are MSE values according to the coordinate values. For example, generally, at x=0, the MSE is a minimum among coordinate values of the form of an integer. This result is because a coordinate value having a minimum MSE is defined as x=0 rather than x=1 or x=−1. However, when a graph is minutely generated, the real minimum MSE slightly leans to a negative (−) number rather than 0, as illustrated in FIG. 8. Then, when the real minimum MSE is approximated using a quadratic function, an x coordinate value having a differential value of 0 can be acquired. When an x coordinate value is −1, 0, or 1, a y coordinate value can be directly acquired since an MSE value corresponding to each coordinate value can be calculated. That is, f(0) is an MSE value at x=0, f(1) is an MSE value at x=1 when 1 is added to a minimum MSE value, and f(−1) is an MSE value at x=−1.

Accordingly, when −1, 0 and 1 are each substituted for x, $f(x)=ax^2+bx+c$ is calculated as follows:

$$a-b+c=f(-1)$$

$$c=f(0)$$

$$a+b+c=f(1).$$

Then, by using simultaneous equations, the following result is deduced:

$$a=(f(-1)+f(1))/2-f(0)$$

$$b=(f(1)-f(-1))/2$$

$$a.=f(0).$$

A minimum point is an x coordinate value when a differential value is 0 in a quadratic function. Thus, f(x)=2ax+b=0, and x=−b/2a when f'(x)=2ax+b=0.

When a and b values, which are acquired as described above, are substituted for x=−b/2a, x is calculated according to the following equation (1):

$$x=(f(-1)-f(1))/(2f(-1)+2f(1)-4f(0)) \qquad (1)$$

That is, after calculating an MSE having a minimum coordinate value, MSEs before and after coordinate values with respect to the MSE having a minimum coordinate value are additionally calculated. Thus, precise coordinates can be acquired using equation (1).

Although the precision calculation method according to an embodiment of the present invention is approximately calculated by using a quadratic function, other aspects of the present invention are not limited to using the quadratic function. For example, a multi-function can be used, and optimized coordinates can be acquired using a function presumptive equation with other interpolations. In addition, optimized coordinates can be acquired considering an MSE of y axis data as well as an MSE of x axis data. Although it is not important that the optimized coordinates are simply calculated as a minimum MSE, it is important that a method for increasing precision in the form of a real number (to a decimal point) can be additionally used by using distribution of values, which can estimate an MSE around the minimum MSE or an error.

Positions of the alignment marks 501, 502, 503, and 504 acquired by the precision calculating method can be used to move x and y coordinate values of the two-dimensional quantization data 320 acquired by the detector 419 to an original position corresponding to the original two-dimensional binary data 310 generated by the SLM 414. An algorithm used in this case is now described When coordinate values to be finally moved are denoted x' and y', x' and y' depend on x and y, and are added by offset in terms of DC. In addition, x' and y' may be affected by a reciprocal action in which x and y are repeatedly used. This reciprocal action is given by equation 2 as follows:

$$ax+by+cxy+d=x'$$

$$ex+fy+gxy+h=y' \qquad (2)$$

Since the number of the alignment marks 501, 502, 503, and 504 is four, when coordinate values are substituted for four arrangements, eight equations are given by equation 3 as follows:

$$ax0+by0+cx0y0+d=x0'$$

$$ax1+by1+cx1y1+d=x1'$$

$$ax2+by2+cx2y2+d=x2'$$

$$ax3+by3+cx3y3+d=x3'$$

$$ex0+fy0+gx0y0+h=y0'$$

$$ex1+fy1+gx1y1+h=y1'$$

$$ex2+fy2+gx2y2+h=y2'$$

$$ex3+fy3+gx3y3+h=y3' \qquad (3)$$

However, it is understood that the number of the alignment marks is not limited to four, and thus, the number of equations in equation 3 may change accordingly. As shown in Equation 3, since the upper four equations and the lower four equations are respectively four-dimensional quadratic simultaneous equations, when these equations are substituted into a formula to acquire an inverse matrix which is generally known in the art, values in the range of a to h can be acquired. When these acquired values are substituted into equation 2, a large amount of the two-dimensional quantization data 320 can be converted back to a position of the two-dimensional binary data 310, as illustrated in FIG. 5D.

The above example is an example of the case where the number of alignment marks is four. When the number of alignment marks is 3, the transformation equation is given by equation 4 below. In this case, since there are six equations, when coordinate values are substituted for three alignment marks, a three dimensional quadratic simultaneous equation is acquired to calculate constants, and thus transformation operations can be performed.

$$ax+by+c=x'$$

$$dx+ey+f=y' \qquad (4)$$

Since coordinate values acquired as described above are real numbers having decimals instead of integers, interpolation can be additionally used in order to acquire a correct quantization value.

Figure 9A:
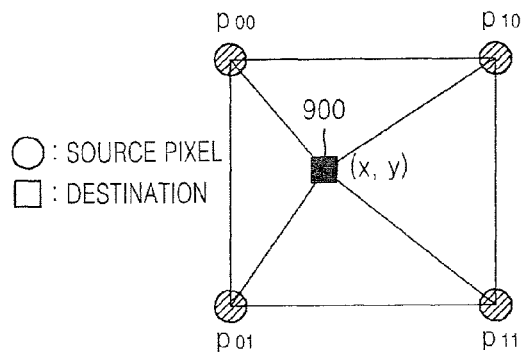
FIGS. 9A and 9B illustrate interpolation, according to an embodiment of the present invention.
Figure 9B:
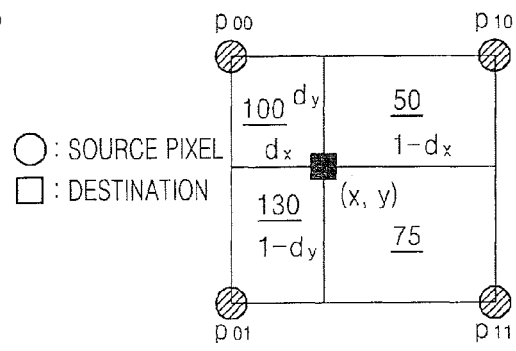

FIGS. 9A and 9B are reference views illustrating interpolation, according to an embodiment of the present invention. Referring to FIGS. 9A and 9B, values of an acquired coordinate 900 are x and y. In this example, a coordinate corresponding to an integer which is most similar to the coordinate 900 is P00 arranged on the upper left. In this case, a correct value is acquired using a quantization value with respect to a peripheral pixel according to the following equation (5):

$$y1=100*(1-dx)+50*dx$$

$$y2=130*(1-dx)+75*dx \qquad (5)$$

A final quantization value of the coordinate 900=y1*(1−dy)+y2*. An example of real coordinate transformation is given using the interpolation of equation 3 as applied to FIG. 9 in terms of a C code as follows.

```
for (i=0;i<ccdsizex;i++) for(j=0;j<ccdsizey;j++)
{
  res[i][j]=0;
  newx=(float)i*a__d[0]+(float)j*a__d[1]+(float)i*(float)j*a__d[2]+a__d[3];
  newy=(float)i*e__h[0]+(float)j*e__h[1]+(float)i*(float)j*e__h[2]+e__h[3];
  if ((newx>=0)&&(newx<(ccdsizex-1))&&(newy>=0)&&
  (newy<(ccdsizey-1)))
  {
    aa=ccddata[(int)newx][(int)newy];
    bb=ccddata[(int)newx][(int)newy+1];
    cc=ccddata[(int)newx+1][(int)newy];
    dd=ccddata[(int)newx+1][(int)newy+1];
    aacc=(float)(aa*(1.+(int)newx-newx)+cc*(newx-(int)newx));
    bbdd=(float)(bb*(1.+(int)newx-newx)+dd*(newx-(int)newx));
    res[i][j]=(float)(aacc*(1.+(int)newy-newy)+bbdd*(newy-(int)newy));
  }
}
```

In the above program, "aa," "bb," "cc," "dd," "aacc," and "bbdd" are each temporal variables for using the interpolation illustrated in FIG. 9(*b*), and "res" is a pixel value that is finally calculated. The algorithm above can be used to detect the correct position of the alignment marks 501, 502, 503, and 504, and move pixel values to the correct position considering reciprocal action.

Figure 10:
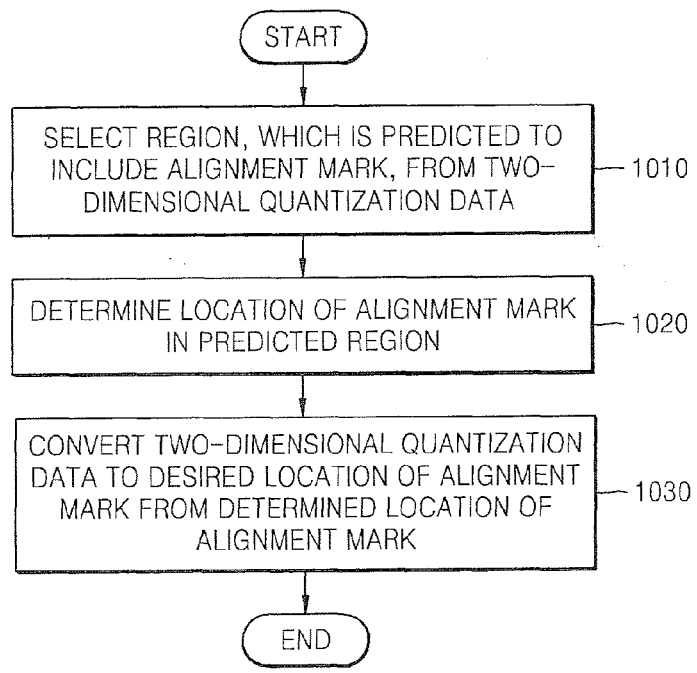
FIG. 10 is a flow chart of a method of converting two-dimensional quantization data, according to an embodiment of the present invention.

FIG. 10 is a flow chart of a method of converting two-dimensional quantization data, according to an embodiment of the present invention. Referring to FIG. 10, a region, such as one of the selection regions 511, 512, 513, and 514, which is predicted to include an alignment mark, such as one of the alignment marks 501, 502, 503, and 504, is selected from the two-dimensional quantization data 320 at operation 1010.

The location of the alignment marks 501, 502, 503, and 504 are determined in a prediction region at operation 1020.

The two-dimensional quantization data 302 is converted to an original location of the alignment marks 501, 502, 503, and 504 from the determined location of the alignment marks 501, 502, 503, and 504 at operation 1030.

Although a system to reproduce the two-dimensional binary data 320 recorded to the holographic storage medium 250 is described above in the context of a data restoring method, aspects of the present invention are not limited thereto. That is, a system to record and/or reproduce the two-dimensional binary data 310, in which the two-dimensional quantization data 320 is reproduced, and a system to record the two-dimensional quantization data 320 and to restore the two-dimensional quantization data 320 to the original binary data 310, may also be used according to other aspects of the present invention.

Aspects of the present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and a computer data signal embodied in a carrier wave comprising a compression source code segment comprising the code and an encryption source code segment comprising the code (such as data transmission through the Internet). The computer readable recording medium can also be distributed over network coupled computer systems so that the computer readable code is stored and executed in a distributed fashion. In addition, a functional program, a code and a code segment to realize data restoring methods according to aspects of the present invention are understood by one of ordinary skill in the art.

Aspects of the present invention can be used to accurately detect the positions of the alignment marks 501, 502, 503, and 504 and to accurately move pixels to correct locations in a holographic storage medium system. Thus, aspects of the present invention reduce a bit error rate (BER) and improve the performance of the recording and/or reproducing apparatus 400.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method to restore quantization data to binary data in a system for recording and/or reproducing the binary data, the method comprising:
    selecting a selection region predicted to include an alignment mark from the quantization data;
    determining a location of the alignment mark within the selection region by obtaining integer value coordinates closest to the alignment mark and obtaining real number value coordinates through calculations using data adjacent to the integer value coordinates; and
    converting the quantization data to the binary data based on a comparison of the determined location of the alignment mark and an original location of the alignment mark in the binary data.

2. The method of claim 1, wherein the determining of the location of the alignment mark comprises:
    obtaining x and y coordinates of a portion of the selection region which is most similar to the alignment mark from the selection region, the x and y coordinates of the portion in forms of integers; and
    obtaining the x and y coordinates in forms of real numbers by using two pieces of the quantization data adjacent to the x and y coordinates.

3. The method of claim 2, wherein the obtaining of the x and y coordinates in the forms of real numbers comprises:
    calculating the x and y coordinates using a quadratic function $f(x)=ax^2+bx+c$ having a differential value equal to 0,
    wherein x is a coordinate value of the x coordinate and $f(x)$ is a mean square error (MSE) value according to the coordinate value.

4. The method of claim 1, wherein the converting comprises:
    converting the quantization data based on a reciprocal action of x and y coordinates of a portion of the selection region which is most similar to the alignment mark.

5. The method of claim 1, wherein the converting comprises:
    interpolating the converted quantization data having a converted coordinate value using more than four pieces of the converted quantization data positioned around the converted coordinate value.

6. The method of claim 1, wherein the quantization data comprises page data read from a holographic storage medium.

7. A holographic storage data recording and/or reproducing apparatus to record data to and/or reproduce data from a holographic storage medium on which a hologram is recorded by interference between a signal beam and a reference beam, the apparatus comprising:
    an optical processing unit to record the data on the holographic storage medium and to reproduce the data from the holographic storage medium; and
    a controller to control the optical processing unit, to select a selection region predicted to include an alignment mark from quantization data read from the holographic storage medium, to determine a location of the alignment mark within the selection region by obtaining integer value coordinates closest to the alignment mark and obtaining real number value coordinates through calculations using data adjacent to the integer value coordinates, and to convert the quantization data to the binary data based on a comparison of the determined location of the alignment mark and an original location of the alignment mark in the binary data.

8. The apparatus of claim 7, wherein the controller obtains x and y coordinates of a portion of the selection region which is most similar to the alignment mark from the selection region in the forms of integers, and obtains the x and y coordinates in the forms of real numbers by using two pieces of the quantization data adjacent to the x and y coordinates.

9. The apparatus of claim 8, wherein the controller calculates the x and y coordinates using a quadratic function $f(x)=ax^2+bx+c$ having a differential value equal to 0 in order to obtain the x and y coordinates in the forms of the real numbers, wherein x is a coordinate value of the x coordinate and $f(x)$ is a mean square error (MSE) value of the x coordinate.

10. The apparatus of claim 7, wherein the controller converts the quantization data based on a reciprocal action of x and y coordinates.

11. The apparatus of claim 7, wherein the controller interpolates the converted quantization data having a converted coordinate value using more than four pieces of the converted quantization data positioned around the converted coordinate value.

12. A method to restore quantization data to binary data in a system for recording and/or reproducing the binary data, the method comprising:
    determining a location of an alignment mark recorded within the quantization data by obtaining integer value coordinates closest to the alignment mark and obtaining real number value coordinates through calculations using data adjacent to the integer value coordinates; and
    converting the quantization data to the binary data by comparing the determined location of the alignment mark and an original location of the alignment mark in the binary data.

13. The method of claim 12, wherein the determining of the location of the alignment mark comprises selecting a selection region within the quantization data predicted to include the alignment mark.

14. The method of claim 13, wherein the determining of the location of the alignment mark further comprises moving the alignment mark around the selection region to search for the alignment mark.

15. A holographic storage data recording and/or reproducing apparatus to record data to and/or reproduce data from a holographic storage medium on which a hologram is recorded by interference between a signal beam and a reference beam, the apparatus comprising:
    an optical processing unit to record the data on the holographic storage medium and to reproduce the data from the holographic storage medium; and
    a controller to control the optical processing unit, to determine a location of the alignment mark within quantization data reproduced from the holographic storage medium by obtaining integer value coordinates closest to the alignment mark and obtaining real number value coordinates through calculations using data adjacent to the integer value coordinates, and to convert the quantization data to binary data by comparing the determined location of the alignment mark and an original location of the alignment mark in the binary data.

16. The holographic storage data recording and/or reproducing apparatus of claim 15, wherein the controller determines the location of the alignment mark by selecting a selection region within the quantization data predicted to include the alignment mark.

17. The holographic storage data recording and/or reproducing apparatus of claim 16, wherein the controller further determines the location of the alignment mark by moving the alignment mark around the selection region to search for the alignment mark.

* * * * *